United States Patent
Ishikawa et al.

(10) Patent No.: US 8,700,379 B2
(45) Date of Patent: Apr. 15, 2014

(54) METHOD AND APPARATUS FOR SIMULATING MICROCOMPUTER-BASED SYSTEMS

(75) Inventors: Makoto Ishikawa, Novi, MI (US); Shigeru Oho, Farmington Hills, MI (US); George Saikalis, West Bloomfield, MI (US); Donald J. McCune, Farmington Hills, MI (US); Jonathan Borg, Livonia, MI (US)

(73) Assignee: Hitachi, Ltd, Tokyo (JP)

( * ) Notice: Subject to any disclaimer, the term of this patent is extended or adjusted under 35 U.S.C. 154(b) by 809 days.

(21) Appl. No.: 12/840,354

(22) Filed: Jul. 21, 2010

(65) Prior Publication Data

US 2010/0286970 A1 Nov. 11, 2010

Related U.S. Application Data

(63) Continuation of application No. 11/391,878, filed on Mar. 29, 2006, now Pat. No. 7,778,806.

(51) Int. Cl.
*G06F 9/445* (2006.01)
*G06F 17/50* (2006.01)

(52) U.S. Cl.
USPC ........ 703/22; 703/2; 703/17; 700/17; 700/49; 700/80; 702/185; 715/965

(58) Field of Classification Search
USPC ......... 703/2, 22, 17; 700/17, 49, 80; 702/185; 715/965
See application file for complete search history.

(56) References Cited

U.S. PATENT DOCUMENTS

| | | | |
|---|---|---|---|
| 6,016,555 | A | 1/2000 | Deao et al. |
| 6,065,106 | A | 5/2000 | Deao et al. |
| 6,081,885 | A | 6/2000 | Deao et al. |
| 6,553,513 | B1 | 4/2003 | Swoboda et al. |
| 6,643,803 | B1 | 11/2003 | Swoboda et al. |
| 6,898,542 | B2 | 5/2005 | Ott et al. |
| 7,181,550 | B2 | 2/2007 | Shepard et al. |
| 7,317,953 | B2 | 1/2008 | Wojsznis et al. |

(Continued)

FOREIGN PATENT DOCUMENTS

| | | |
|---|---|---|
| JP | 2000-200026 A | 7/2000 |
| JP | 2001-273173 A | 10/2001 |
| JP | 2003-256239 A | 9/2003 |

OTHER PUBLICATIONS

Japanese Office Action dated Nov. 20, 2012 related to Application No. 2011-148798.

(Continued)

*Primary Examiner* — Thai Phan
(74) *Attorney, Agent, or Firm* — Gifford, Krass, Sprinkle, Anderson & Citkowski, P.C.

(57) ABSTRACT

A method and apparatus for developing microcomputer-based systems. A controller model having at least one parameter is simulated and, similarly, a plant model having at least one parameter and controlled by the controller model is simulated. A user interface then has access to the parameters of the controller model and plant model and optionally suspends the execution of the controller model and plant model in response to a trigger event. The user interface determines the status of the controller model parameters and/or plant model parameters at the time of the trigger without altering the controller model parameters or plant model parameters or the program code of the controller model.

16 Claims, 6 Drawing Sheets

(56) References Cited

U.S. PATENT DOCUMENTS

| | | |
|---|---|---|
| 7,647,126 B2 * | 1/2010 | Blevins et al. ............... 700/49 |
| 7,783,370 B2 * | 8/2010 | Nixon et al. ............... 700/83 |
| 8,135,481 B2 * | 3/2012 | Blevins et al. ............... 700/51 |
| 2004/0078182 A1 | 4/2004 | Nixon et al. |
| 2005/0096872 A1 | 5/2005 | Blevins et al. |
| 2007/0132779 A1 | 6/2007 | Gilbert et al. |
| 2007/0165031 A1 | 7/2007 | Gilbert et al. |
| 2007/0168060 A1 | 7/2007 | Nixon et al. |
| 2007/0179641 A1 | 8/2007 | Lucas et al. |
| 2012/0083904 A1 * | 4/2012 | Adavi et al. ............... 700/30 |

OTHER PUBLICATIONS

Japanese Office Action for JP 2007-087090.

* cited by examiner

| Address | Code | Mnemonic |
|---------|------|----------|
| 000000 | 0F9A | ADD R0,R1 |
| 000002 | C003 | MOV R1, @R3 |
| 000004 | 28DB | MUL R2,R1 |
| 000006 | F35E | JMP @R4 |
*Fig-5D*
| R0 | 3F20 |
|----|------|
| R1 | 1C2A |
| R2 | 001E |
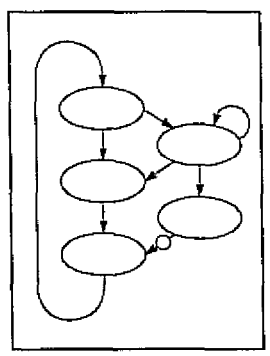
*Fig-5F*
*Fig-5E*
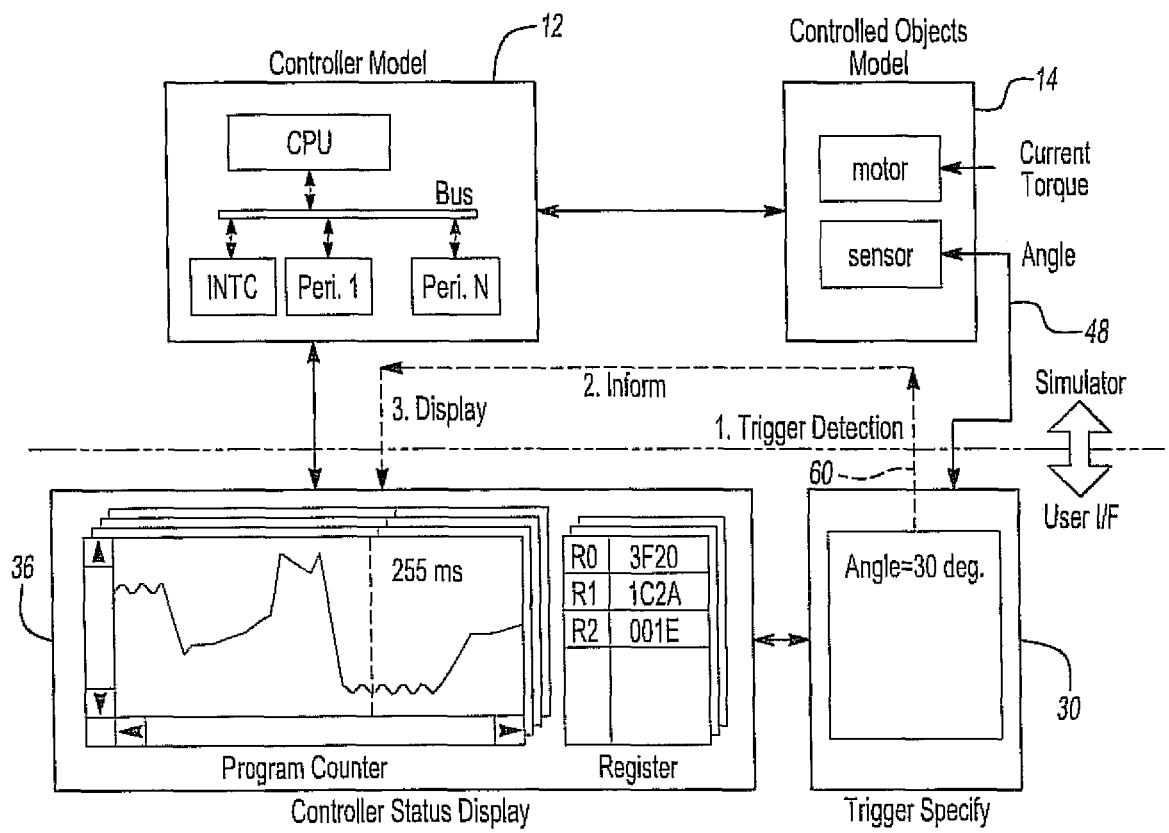
*Fig-6*

METHOD AND APPARATUS FOR SIMULATING MICROCOMPUTER-BASED SYSTEMS

CROSS-REFERENCE TO RELATED APPLICATION

This application is a continuation of U.S. patent application Ser. No. 11/391,878 filed Mar. 29, 2006.

BACKGROUND OF THE INVENTION

I. Field of the Invention

The present invention relates to a method and apparatus for developing microcomputer-based systems.

II. Description of Related Art

There are many applications in which a microcomputer is utilized to control a device oftentimes referred to as the "plant". For example, in the automotive industry, a microcomputer may be utilized to control the actuation of the engine throttle. In that event, the engine throttle is the plant.

In order to facilitate the development of such microcomputer-based systems, there have been previously known simulation or development programs which simulate the operation of the system. These previously known programs use real microcontrollers on real plants. Under program control, the controller then provides signals to the plant to command the plant to perform the desired operation.

As a part of the development of the microcomputer-based system, it is almost always necessary to debug and fine tune the software executed by the controller. This has been previously accomplished by providing break points within the controller program code. Once a break point is encountered in the controller, the execution of the program halts and enables the programmer to examine various parameters of both the controller model as well as the plant model. These parameters include the value of registers, the status of various input and output signals, interrupt status, stock, etc.

After the desired operation of the system has been obtained, the break point is typically removed. Furthermore, the debugging and fine tuning of the microcomputer and plant is an iterative process. For example, once a particular section of the controller program has been fine tuned and/or debugged and the break point removed, it is necessary to insert break points in other sections of the program of the controller until the entire program has been debugged and fine tuned to achieve the desired plant operation.

A primary disadvantage of this previously known method for developing controllers and plants is that the insertion of one or more break points within the program for the controller necessarily is intrusive since it requires a change in the programming of the controller. Such intrusive changes in the programming for the controller in turn oftentimes result in unwanted and unexpected changes in the operation of either the controller or the plant or both. Such unexpected and unwanted changes in turn require additional debugging and fine tuning of the overall microcomputer-based system.

A still further disadvantage of these previously known development programs for microcomputer-based systems is that, while the execution of the controller may be halted whenever desired, the plant usually exhibits mechanical characteristics, such as inertia, and cannot be halted whenever desired. Consequently, following a suspension of execution of the controller, upon the continued execution of the controller the plant is in a different position or configuration than at the time execution of the controller program was halted. This discrepancy results in error of the system operation thus necessitating further debugging and controller programming development.

SUMMARY OF THE PRESENT INVENTION

The present invention provides both a method and apparatus for developing microcomputer-based systems which overcomes the above-mentioned disadvantages of the previously known methods and devices.

In brief, the method of the present invention simulates a controller model having at least one parameter as well as a plant model also having at least one parameter and controlled by the controller model. These parameters can include the value of registers in the controller model, the status of inputs and outputs of both the controller model and plant model, as well as other factors indicative of the condition of the overall system.

A user interface is then implemented which has access to the parameters of both the controller model and plant model. During a simulation, the user interface suspends the execution of the controller model and plant model in response to a trigger event. The trigger event may consist of a condition of either the plant model, the controller model or initiated through the user interface.

During the suspension of the execution of the controller model and plant model, the user interface determines the status of the controller model parameters and/or the plant model parameters without altering any of the controller model parameters or the plant model parameters. Since the suspension of the program execution of the controller model and plant model occurs unobtrusively, i.e. without changing the controller program by the insertion of break points into the program for the controller model, the introduction of unwanted and unexpected errors that would otherwise be caused by the introduction of such break points is avoided.

In a modification of the invention, the user interface accesses and displays one or more selected parameters of the plant and/or controller model in response to a preset condition, but without suspending the simulation of the plant and controller models.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIGS. 5A-5F are all exemplary views of output displays;

FIG. 6 is a block diagrammatic view illustrating the operation of the present invention;

DETAILED DESCRIPTION OF PREFERRED EMBODIMENTS OF THE PRESENT INVENTION

Figure 1:
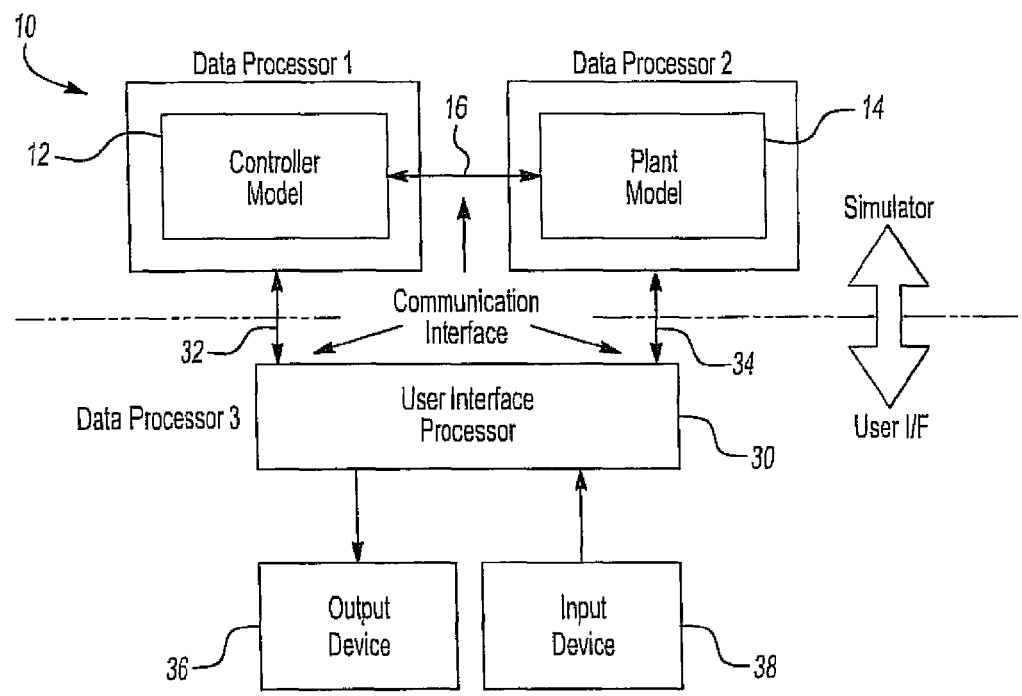
FIG. 1 is a block diagrammatic view illustrating a first preferred embodiment of the present invention.

With reference first to FIG. 1, a block diagrammatic view of a preferred embodiment of the system 10 for developing microprocessor-based systems of the present invention is shown. The system 10 includes a simulation of a controller model 12 as well as a plant model 14. The controller model 12 operates under program control and controls the operation of the plant model 14 through one or more simulated control lines 16. Although the plant 14 may be any object that is controlled by a microcomputer, one example of such a plant in the automotive industry would be an electrically controlled throttle valve. In such an application, the controller model 12 controls the operation, i.e. opening and closure, of the throttle.

Figure 2:
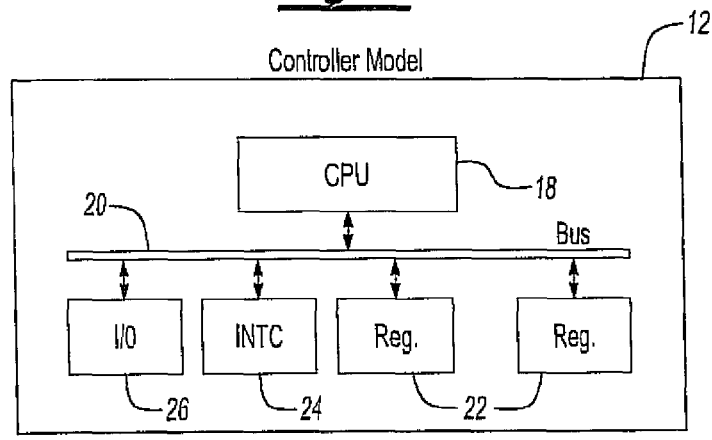
FIG. 2 is a block diagrammatic view of a controller model.

With reference now to FIG. 2, a block diagrammatic view of an exemplary controller model 12 is shown. The controller model 12 includes a central processing unit 18 which communicates through a bus 20 with one or more control registers 22. The bus 20 may also communicate with an interrupt priority 24 as well as input and output lines 26.

The central processing unit 18 in the conventional fashion operates under program control containing lines of program code which are executed in response to a clock timing signal. This program code may be modified as desired by the designer, which in turn changes the various values in the control register 22, interrupt priority 24 and/or I/O lines 26. Furthermore, the values of the registers 22, interrupt priority 24 and I/O 26 lines all constitute parameters of the controller model 12.

Figure 3:
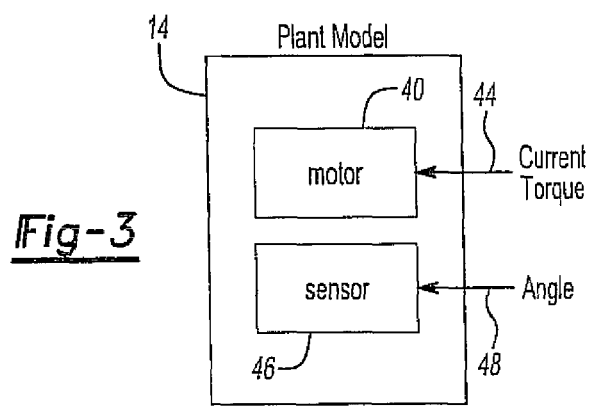
FIG. 3 is a block diagrammatic view of a plant model.

With reference to FIG. 3, an exemplary block diagrammatic view of the plant 14 is shown for an electronic throttle control. As such, the plant model 14 includes a simulated motor 40 having a parameter on line 44 indicative of the motor current and thus the motor torque. The plant model 14 also includes a simulated sensor 46 having a simulated output 48 indicative of the angle of a throttle plate. The values on the lines 44 and 48 constitute the parameters of the plant model 14 which vary in response to commands from the controller model 12.

A user interface 30 communicates with the controller model 12 through input/output lines 32. Similarly, the user interface 30 communicates with the plant model 14 through input/output lines 34. The user interface 30 also communicates with an output device 36, such as a video monitor, printer or data source device to enable the system operator to analyze the results of the overall system simulation. Similarly, an input device 38, such as a mouse, keyboard and the like, also communicates with the user interface 30 to allow the operator to control the execution of the overall system simulation.

The communication lines 32 and 34 between the user interface 30 and both the controller model 12 and plant model 14 enable the operator to access the various parameters of both the controller model 12 and plant model 14 through the user interface 30. In addition, the communication lines 32 and 34 between the user interface processor 30 enable the user interface processor 30 to suspend the execution of the controller model 12 and plant model 14 without varying the value of any of the parameters of either model 12 or 14.

Furthermore, during the suspension of the execution of the simulated controller model 12 and plant model 14, the operator is able to extract the various parameters of both the controller model 12 and plant model 14 without changing the value of those parameters. Consequently, upon resumption of the execution of the controller program, the controller model will continue execution without any impact on the simulation of the system by the suspension of operation.

Figure 4:
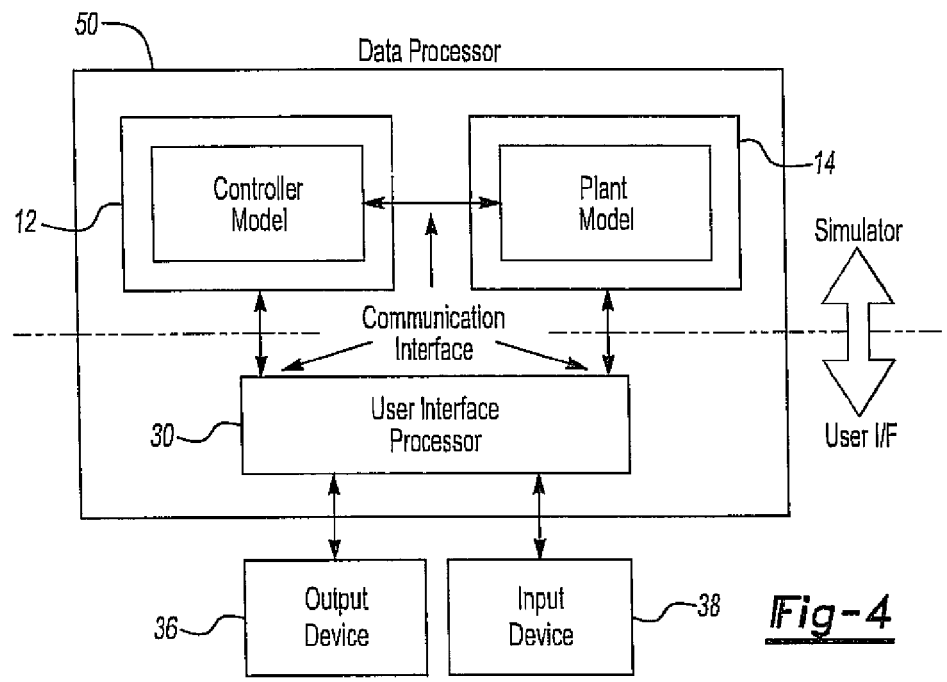
FIG. 4 is a view similar to FIG. 1, but illustrating a modification thereof.

In the block diagrammatic view illustrated in FIG. 1, the controller model 12, plant model 14 and user interface processor 30 are each implemented using a separate processor for both models 12 and 14 as well as the user interface processor 30. However, it is not necessary to use separate processors for the models 12 and 14 and user interface processor 30. Instead, as illustrated in FIG. 4, a single processor computer system may be used to implement the controller model 12 as well as the plant model 14 and user interface processor 30.

Figure 5A:
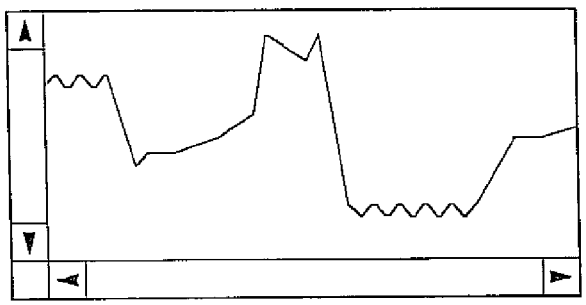

With reference now to FIGS. 5A-5F, exemplary outputs from the simulation of the overall microcomputer-based system on the output device 36 are illustrated. For example, in FIG. 5A, a graph illustrating the value of one parameter of either the controller model 12 or plant model 14 is shown displayed on a visual display. The graph illustrated in FIG. 5A is an exemplary graph of the motor control for an electronically controlled throttle for an automotive vehicle.

Figure 5B:
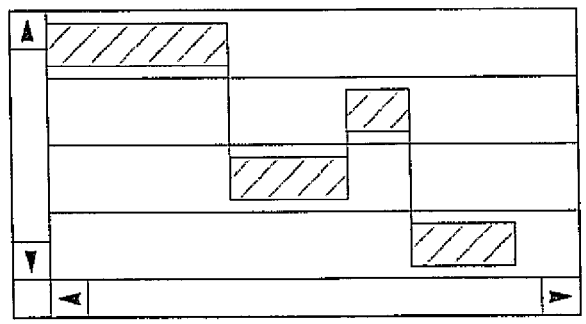
Figure 5C:
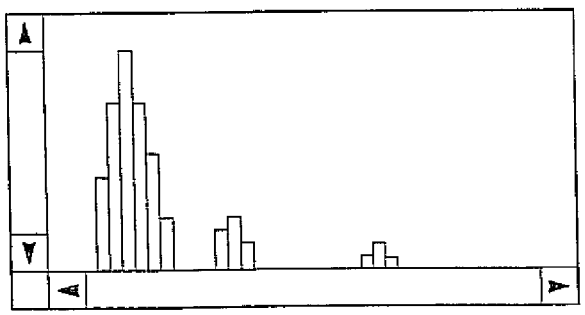

Similarly, FIG. 5B illustrates the display in graph form of the value of one of the parameters from either the controller model 12 or plant model 14. As illustrated, FIG. 5B is a task scheduling display or Gantt chart in a multitask OS system. FIG. 5C similarly displays the value of one of the parameters in bar graph form and, as shown for illustration purposes, is a histogram of periodic task execution time.

FIG. 5D is an exemplary display of the executing or executable code of the program which controls the operation of the controller model 12. Similarly, FIG. 5E represents a display of several registers of the controller model 12.

Lastly, FIG. 5F represents an exemplary display of a graphical program of the program for the controller model 12 and is illustrated as a state flow graph on graphical algorithm description tool. Such a display may change indicating the relative position of the graphical display depending upon the point of execution of the controller model 12 during the system simulation.

With reference now to FIG. 6, the operation of the present invention will now be described. As shown in FIG. 6, the plant model 14 is illustrated as an electronic throttle control (FIG. 3) having an output parameter 48 indicative of the angle of the throttle plate. This angle parameter on line 48 provides an input signal to the user interface processor 30.

In the example shown in FIG. 6, the user interface processor 30 is programmed to detect a predetermined angle, e.g. thirty degrees, of the simulated throttle plate as a trigger event. Consequently, once a throttle angle of thirty degrees is detected by the user interface processor 30, the user interface processor 30 generates an output signal on line 60 to both the plant model 14 and controller model 12 to suspend the execution of both models 12 and 14.

During the suspension of the system simulation in response to the trigger event, the user interface processor 30 acquires the desired parameters from the controller model 12 and/or the plant model 14 and displays these parameters on the display device 36. However, when acquiring the parameters from both the controller model 12 and plant model 14, the user interface processor 30 does not in any way vary these parameters. Consequently, upon resumption of the simulation by resuming the execution of the program by the controller model 12, the simulation of the overall system will continue as if a suspension had not occurred.

Figure 7:
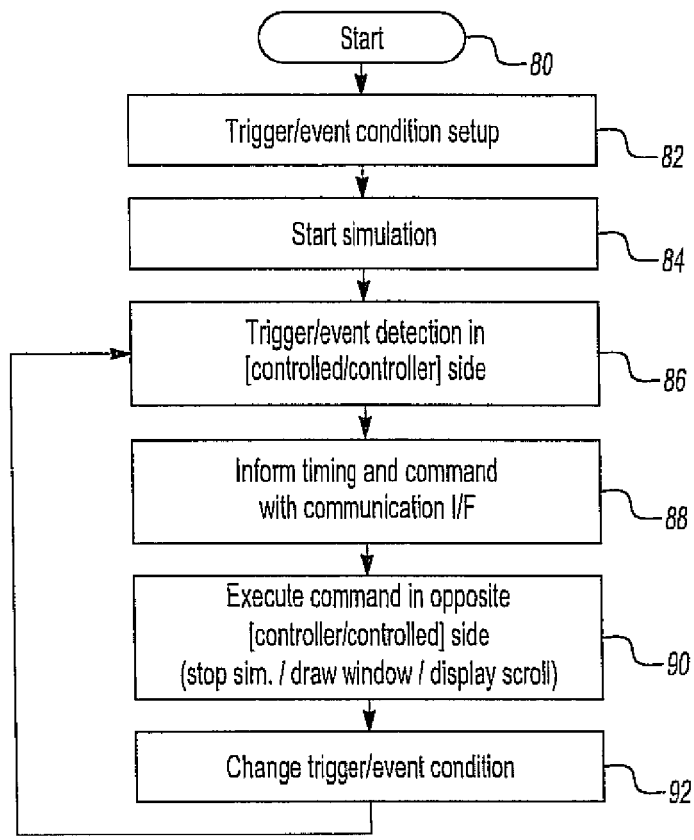
FIG. 7 is a flowchart illustrating the operation of the present invention.

With reference now to FIG. 7, a flowchart illustrating the operation of the present invention is shown. At step 80, the initial setup for the simulation begins and proceeds to step 82 where the operator sets the trigger event condition using the user interface 30. Step 82 then proceeds to step 84.

At step 84 the simulation under control of the user interface processor is initiated. During the simulation, the speed of the simulation may also be controlled by the user interface processor by simply varying the speed of the clock signal through the user interface processor 30.

The simulation continues until the trigger event is detected at step 86. Step 86 then proceeds to step 88 where the user interface processor suspends the system simulation by halting the clock signal to the controller model 12 and plant model 14. Step 88 then proceeds to step 90.

At step 90 the user interface executes the appropriate commands to create the desired display on the display device 36 as shown in FIG. 6. After the data display has been analyzed by the designer, step 90 proceeds to step 92 where the operator, if desired, may set a different trigger event. Step 92 then returns to step 86 where the above process is repeated.

Figure 8:
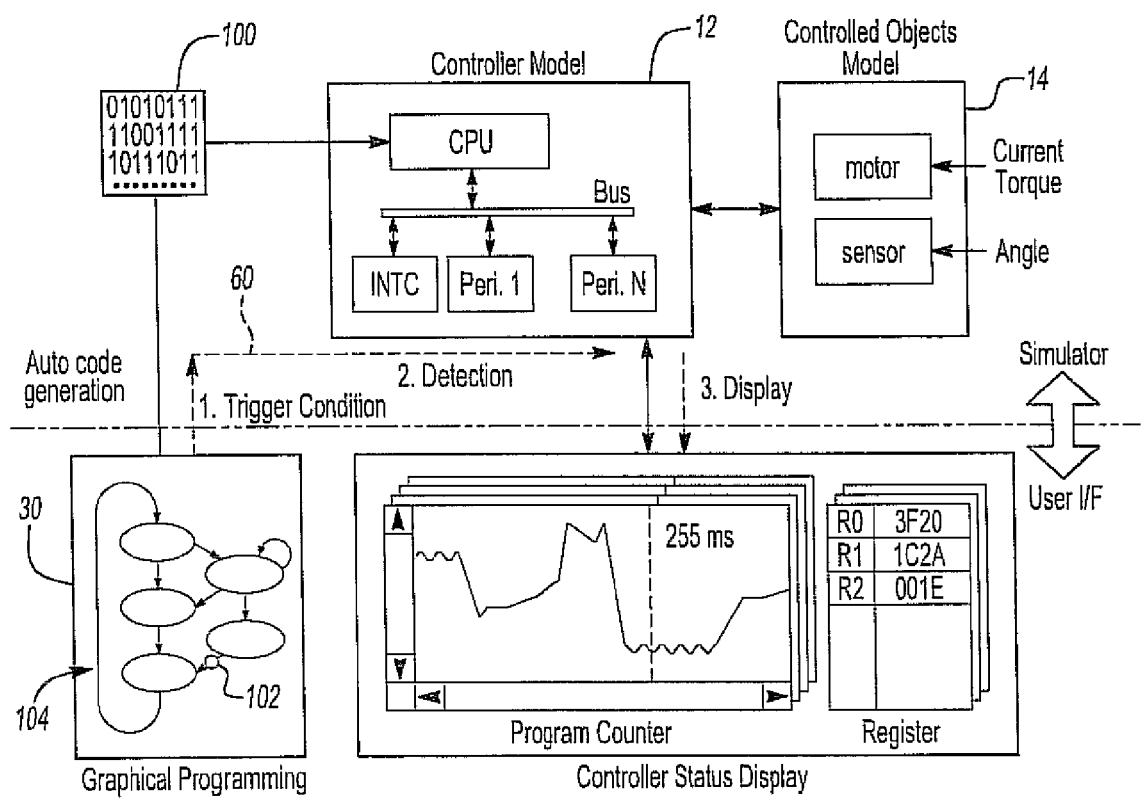
FIG. 8 is a view similar to FIG. 6 but illustrating a modification thereof.

With reference now to FIG. 8, a still further example of the operation of the present invention is shown. FIG. 8 is similar to FIG. 6 except that the trigger event is set by the controller model 12 rather than the plant model 14. For example, the value of certain registers 100 in the controller model 12 may be monitored by the user interface processor 30 so that, when the value of the registers 100 is equal to a certain value, the user interface processor 30 detects the trigger signal and generates the output on line 60 to suspend the operation of the simulation. When this occurs, the simulation continues as previously described with respect to FIG. 7.

Still referring to FIG. 8, a still further feature is that the trigger event may be specified in graphically expressed algorithm illustrated diagrammatically at point 102 in the graphical algorithm 104. Other means for specifying the trigger condition of the controller model 12 may alternatively be used.

Figure 9:
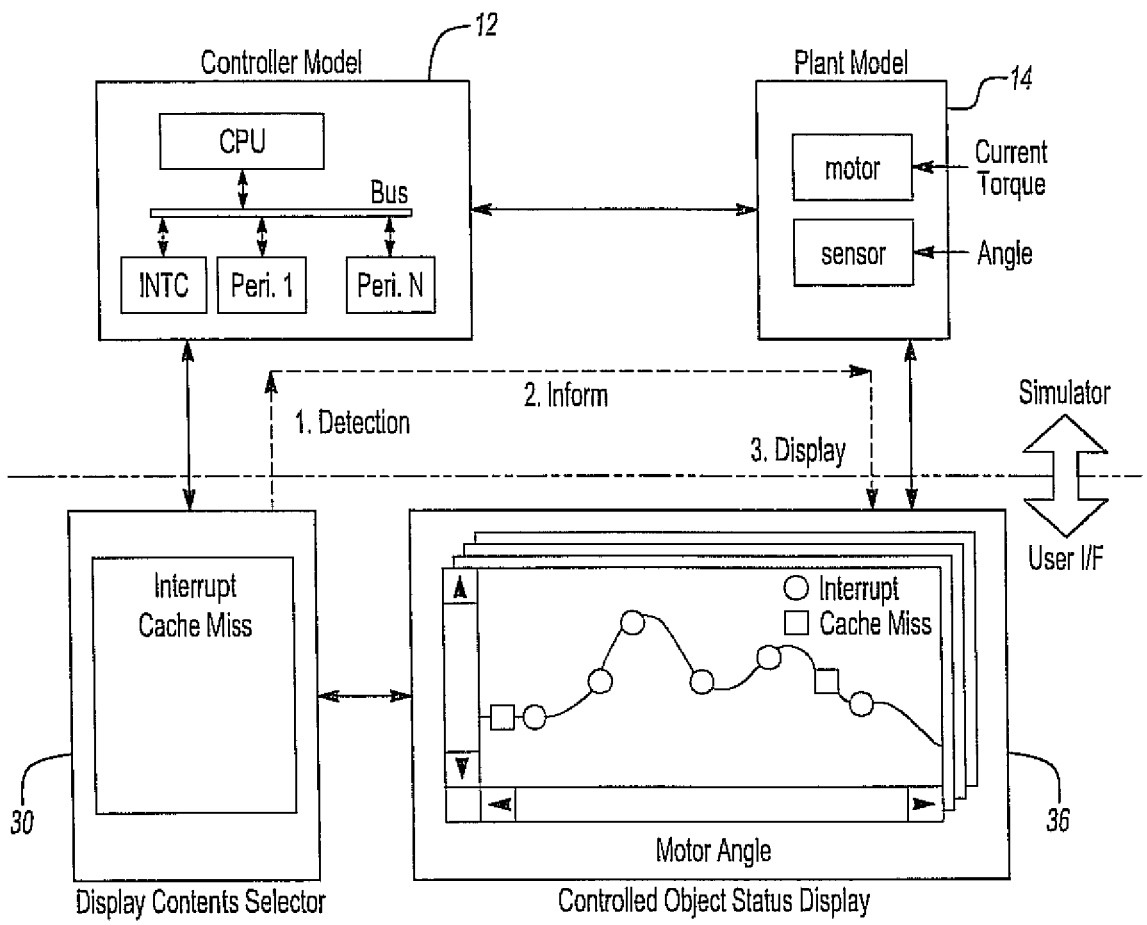
FIG. 9 is a view similar to FIG. 6 but illustrating a modification thereof.

With reference now to FIG. 9, a still further modification is illustrated in which an interrupt status of the controller model 12 forms the trigger event. Furthermore, FIG. 9 also illustrates that the status of the various parameters of both the controller model 12 as well as the plant model 14 may be shown on the display device 36.

The modification shown in FIG. 9 further differs from the previously described embodiments of the invention in that, upon the detection of the trigger event, e.g. an interrupt or cache miss in the controller module 12, the user interface 30 does not suspend execution of the controller model 12 or plant model 14. Instead, in response to the trigger event the user interface 30 accesses the value of one or more selected parameters of the plant model 14 or controller model 12 and displays these parameter(s) on the display device 36 and continues the simulation of the controller model 12 and plant model 14.

Figure 10:
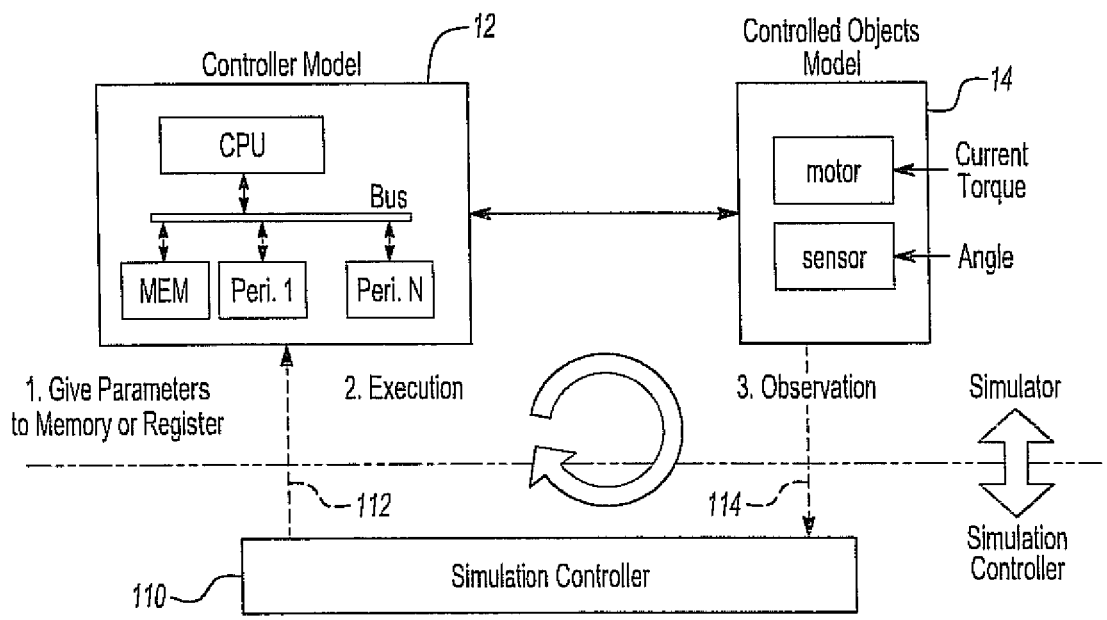
FIG. 10 is a block diagrammatic view of a further preferred embodiment of the invention.

With reference now to FIG. 10, a modification of the present invention is shown in which a simulation controller 110 replaces the user interface processor 30. The simulation controller 110 processes the execution of the system simulation rather than the user. However, like the user interface processor 30, the simulation controller 110 can retrieve the various parameters for both the controller model 12 and plant model 14 in a non-intrusive fashion by suspending the operation of the simulation in the previously described fashion.

An advantage of the simulation controller is that the simulation controller 110 may be used to automatically vary parameters of both the controller model 12 and plant model 14 during the simulation in order to achieve optimal performance of the overall simulated system. The simulation controller 110 achieves this by providing the appropriate parameters on line 112 to the controller model 12 and observing the results on the plant model 14 on output lines 114. One example of the different parameters provided by the simulation controller 110 to the controller model 12 would be to provide new values for various lookup tables and other constants maintained by the controller model 12.

Figure 11:
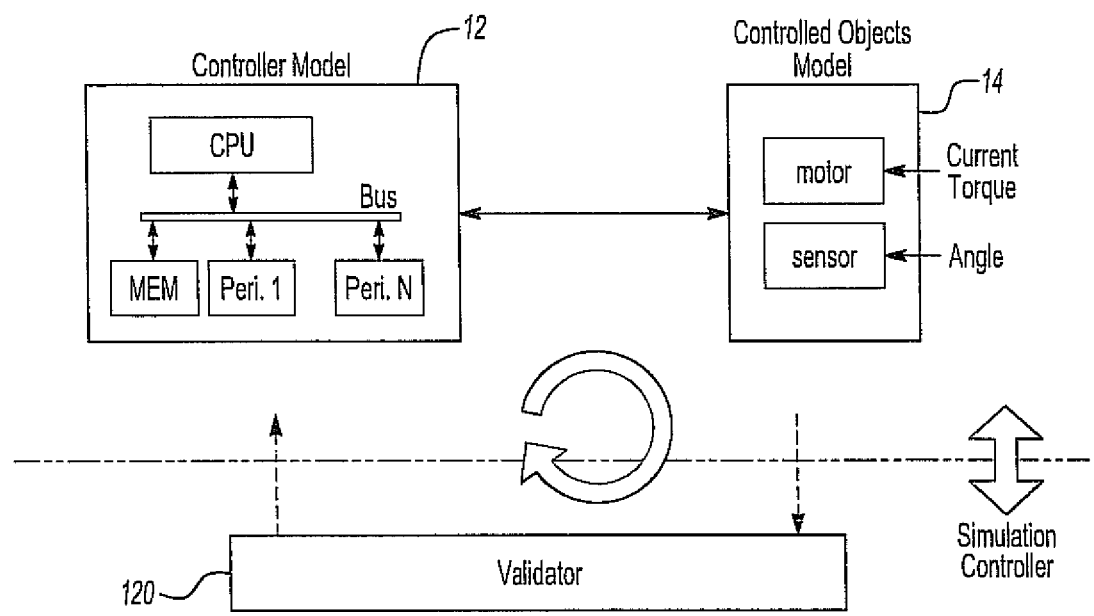
FIG. 11 is a view similar to FIG. 10, but illustrating a still further embodiment of the present invention.

With reference now to FIG. 11, a still further modification is shown in which a validator 120 controls the execution of the system simulation in order to validate its accuracy. In this event, the validator 120 provides a test pattern or test program to the controller model 12 and then monitors the resulting behavior of the plant model 14. The validator 120 then verifies the accuracy of the plant model 14 by comparing the behavior of the plant model 14 with system specifications. Similarly, the simulation controller monitors the behavior of the controller model 12 and compares that behavior against system specifications in order to validate the controller model 12.

From the foregoing, it can be seen that the present invention provides both an apparatus and method for developing microcomputer-based systems and which is capable of unobtrusively monitoring the status of the various parameters of both the controller model as well as the plant model during the simulation. Having described our invention, however, many modifications thereto will become apparent to those skilled in the art to which it pertains without deviation from the spirit of the invention as defined by the scope of the appended claims.

We claim:

1. A method for developing a system with a simulating microcomputer-based systems comprising the steps of:
    simulating a microcomputer-based controller model and a plant model, said microcomputer-based controller model having a plurality of first parameters related to a computer performing the simulation, said plant model having a plurality of second parameters related to a hardware parts simulated by the computer in the plant model; and
    displaying both said plurality of first and second parameters.

2. The method according to claim 1, wherein an interface processor is provided to access both said plurality of first and second parameters.

3. The method according to claim 2, wherein said plant model includes a simulated motor and a simulated sensor, and is modeled for an electronic throttle control, and said plurality of second parameters includes a motor current.

4. The method according to claim 3, wherein said microcomputer-based controller model includes a central processing unit, interrupt priority line, and a plurality of registers coupled to said central processing unit via a bus, and said plurality of first parameters includes values for said plurality of registers.

5. The method according to claim 3, further comprising a step of:
    suspending execution of the controller model and plant model through said interface processor in response to a trigger event.

6. The method according to claim 5, wherein during said suspension said plurality of first and second parameters is displayed while said interface processor does not vary the parameters.

7. The method according to claim 5, wherein said interface processor controls speed of said simulation by varying the speed of a clock signal.

8. The method according to claim 6, wherein said interface processor halts said clock signal to said controller model and plant model to cause said suspension.

9. A simulation system comprising:
a microcomputer-based controller model executed by a data processor; and
a plant model executed by the data controller, said microcomputer-based controller model having a plurality of first parameters related to a computer performing the simulation, said plant model having a plurality of second parameters related to a hardware parts simulated by the computer in the plant model; and
a display configured to display both said plurality of first and second parameters.

10. The system according to claim 9, wherein an interface processor is provided to access both said plurality of first and second parameters.

11. The system according to claim 10, wherein said plant model includes a simulated motor and a simulated sensor, and is modeled for an electronic throttle control, and said plurality of second parameters includes a motor current.

12. The system according to claim 11, wherein said microcomputer-based controller model includes a central processing unit, interrupt priority line, and a plurality of registers coupled to said central processing unit via a bus, and said plurality of first parameters includes values for said plurality of registers.

13. The system according to claim 11, and further comprising means for suspending execution of the controller model and plant model through said interface processor in response to a trigger event.

14. The system according to claim 13, wherein during said suspension said plurality of first and second parameters is displayed while said interface processor does not vary the parameters.

15. The system according to claim 13, wherein said interface processor controls speed of said simulation by varying the speed of a clock signal.

16. The system according to claim 14, wherein said interface processor halts said clock signal to said controller model and plant model to cause said suspension.

* * * * *